(12) United States Patent
Kim (10) Patent No.: US 11,355,757 B2
(45) Date of Patent: Jun. 7, 2022

(54) ELECTROLYTIC COPPER FOIL, ELECTRODE COMPRISING THE SAME, SECONDARY BATTERY COMPRISING THE SAME, AND METHOD FOR MANUFACTURING THE SAME

(71) Applicant: KCF Technologies Co., Ltd., Anyang-si (KR)

(72) Inventor: Seung Min Kim, Osan-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 110 days.

(21) Appl. No.: 17/083,824

(22) Filed: Oct. 29, 2020

(65) Prior Publication Data

US 2021/0050598 A1    Feb. 18, 2021

Related U.S. Application Data

(62) Division of application No. 15/773,046, filed as application No. PCT/KR2016/011494 on Oct. 13, 2016, now abandoned.

(30) Foreign Application Priority Data

Nov. 9, 2015    (KR) .................. 10-2015-0156349

(51) Int. Cl.
*C25D 7/06*    (2006.01)
*C25D 3/02*    (2006.01)
(Continued)

(52) U.S. Cl.
CPC .............. *H01M 4/667* (2013.01); *C25D 1/04* (2013.01); *C25D 3/02* (2013.01); *C25D 5/00* (2013.01);
(Continued)

(58) Field of Classification Search
CPC ..................... C25D 7/0628; C23F 11/00–188
See application file for complete search history.

(56) References Cited

U.S. PATENT DOCUMENTS 9,287,566 B1    3/2016    Chou et al.

FOREIGN PATENT DOCUMENTS

CN    101906630 A    12/2010
CN    103460462 A    12/2013
(Continued)

OTHER PUBLICATIONS

Choi et al., Machine Translation, KR 2008-0090154 A (Year: 2008).*
(Continued)

*Primary Examiner* — Harry D Wilkins, III
*Assistant Examiner* — Ho-Sung Chung
(74) *Attorney, Agent, or Firm* — K&L Gates LLP (57) ABSTRACT

Disclosed are an electrolytic copper foil the fold and/or wrinkle of which can be avoided or minimized during a roll-to-roll process, a method for manufacturing the same, and an electrode and a secondary battery which are produced with such electrolytic copper foil so that high productivity can be guaranteed. An electrolytic copper foil of the disclosure has a longitudinal rising of 30 mm or less and a transverse rising of 25 mm or less, and the transverse rising is 8.5 times the longitudinal rising or less.

7 Claims, 3 Drawing Sheets

(51) Int. Cl.
  *C25D 5/00* (2006.01)
  *C25D 1/04* (2006.01)
  *C25D 3/38* (2006.01)
  *H01M 4/66* (2006.01)
  *H01M 4/13* (2010.01)
  *H01M 10/0525* (2010.01)
  *H01M 4/02* (2006.01)

(52) U.S. Cl.
  CPC ............... *C25D 7/06* (2013.01); *H01M 4/13* (2013.01); *H01M 4/66* (2013.01); *H01M 4/661* (2013.01); *H01M 10/0525* (2013.01); *C25D 3/38* (2013.01); *H01M 2004/027* (2013.01)

(56) References Cited

FOREIGN PATENT DOCUMENTS

| | | | |
|---|---|---|---|
| CN | 104419959 A | | 3/2015 |
| EP | 1445351 A1 | | 8/2004 |
| EP | 2654111 A1 | | 10/2013 |
| JP | 11-158652 A | | 6/1999 |
| JP | 2011-134651 A | | 7/2011 |
| KR | 1020040071624 | | 8/2004 |
| KR | 2008-0090154 A | * | 10/2008 |
| KR | 1020140003511 | | 1/2014 |
| TW | 201145660 A | | 12/2011 |
| TW | 201529901 A | | 8/2015 |

OTHER PUBLICATIONS

Taiwanese Office Action for related Taiwanese Application No. 105136494; action dated Jul. 6, 2018; (13 pages).
Korean Office Action for related Korean Application No. 10-2015-0156349; action dated May 21, 2019; (15 pages).
Chinese Office Action for related Chinese Application No. 2019680002180.4; action dated Feb. 20, 2019; (7 pages).
European Search Report for related European Application No. 16864468.0; action dated Apr. 4, 2019; (8 pages).

* cited by examiner

ELECTROLYTIC COPPER FOIL, ELECTRODE COMPRISING THE SAME, SECONDARY BATTERY COMPRISING THE SAME, AND METHOD FOR MANUFACTURING THE SAME

CROSS-REFERENCE TO RELATED APPLICATIONS

The present application is a divisional application of U.S. application Ser. No. 15/773,046, filed May 2, 2018, which is a U.S. national stage application of International Application No. PCT/KR2016/011494, filed Oct. 13, 2016, which claims priority to Korean Application No. 10-2015-0156349, filed Nov. 9, 2015, the disclosures of which are incorporated herein by reference.

FIELD

The present disclosure relates to an electrolytic copper foil, an electrode including the same, a secondary battery including the same, and a method for manufacturing the same.

BACKGROUND

An electrolytic copper foil is used to produce a variety of products such as anode current collectors for secondary batteries and flexible printed circuit boards (FPCBs).

In general, an electrolytic copper foil is produced through a roll-to-roll (RTR) process and is used to produce anode current collectors for secondary batteries, flexible printed circuit boards (FPCBs) and the like, through a roll-to-roll (RTR) process.

A roll-to-roll (RTR) process is known to be suitable for mass-production because it enables continuous production. However, in practice, because of fold and/or wrinkle of an electrolytic copper foil which often occurs during a roll-to-roll (RTR) process, it is necessary to stop a roll-to-roll (RTR) process equipment, solve the problems, and then re-operate the equipment. Repetition of stop and reoperation of the process equipment causes a serious problem of low productivity.

In other words, the fold and/or wrinkle of an electrolytic copper foil which occurs during a roll-to-roll (RTR) process prevent continuous production of products, thus making it impossible to enjoy the advantages unique to the roll-to-roll (RTR) process and resulting in poor productivity.

BRIEF SUMMARY

Therefore, the present disclosure is directed to an electrolytic copper foil, an electrode including the same, a secondary battery including the same and a method for manufacturing the same capable of preventing these limitations and drawbacks of the related art.

An aspect of the present disclosure is to provide an electrolytic copper foil the fold and/or wrinkle of which can be avoided or minimized during a roll-to-roll (RTR) process.

Another aspect of the present disclosure is to provide an electrode which is produced with an electrolytic copper foil through a roll-to-roll (RTR) process without fold and/or wrinkle of the electrolytic copper foil during the process, thereby guaranteeing high productivity.

Further, another aspect of the present disclosure is to provide a secondary battery which is produced with an electrolytic copper foil through a roll-to-roll (RTR) process without fold and/or wrinkle of the electrolytic copper foil during the process, thereby guaranteeing high productivity.

Yet another aspect of the present disclosure is to provide a method of manufacturing an electrolytic copper foil the fold and/or wrinkle of which can be avoided or minimized during a roll-to-roll (RTR) process.

Additional aspects and features of the present disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims.

In accordance with the one aspect of the present disclosure, there is provided an electrolytic copper foil having a first surface and a second surface opposite to the first surface, the electrolytic copper foil comprising: a first protective layer at the first surface; a second protective layer at the second surface; and a copper film between the first and second protective layers, wherein the electrolytic copper foil has a longitudinal rising of 30 mm or less and a transverse rising of 25 mm or less, and the transverse rising is 8.5 times the longitudinal rising or less.

When a center portion of the electrolytic copper foil is cut along a X-shaped cutting line of 5 cm×5 cm in a first direction which makes an angle of 35° to 55° with a longitudinal direction parallel with a transferring mark formed on the electrolytic copper foil and in a second direction perpendicular to the first direction so that a pair of first segments arranged side by side along the longitudinal direction and a pair of second segments arranged side by side along a transverse direction perpendicular to the longitudinal direction are formed, the longitudinal rising and transverse rising are the greater of risings of the first segments in a direction the first or second surface is facing and the greater of risings of the second segments in a direction the first or second surface is facing, respectively.

In accordance with another aspect of the present disclosure, there is provided an electrode for a secondary battery, the electrode comprising: the electrolytic copper foil; and an active material layer on the electrolytic copper foil, wherein the active material layer comprises at least one active material selected from the group consisting of: carbon; a metal of Si, Ge, Sn, Li, Zn, Mg, Cd, Ce, Ni or Fe; an alloy including the metal; an oxide of the metal; and a complex of the metal and carbon.

In accordance with further another aspect of the present disclosure, there is provided a secondary battery comprising: a cathode; an anode; an electrolyte for providing an environment enabling lithium ions to move between the cathode and the anode; and a separator for electrically insulating the cathode from the anode, wherein the anode comprises: the electrolytic copper foil; and an active material layer on the electrolytic copper foil, wherein the active material layer comprises at least one active material selected from the group consisting of: carbon; a metal of Si, Ge, Sn, Li, Zn, Mg, Cd, Ce, Ni or Fe; an alloy including the metal; an oxide of the metal; and a complex of the metal and carbon.

In accordance with yet another aspect of the present disclosure, there is provided a method for manufacturing an electrolytic copper foil, the method comprising: allowing a current to flow between an anode plate and a rotational cathode drum to form a copper film on the rotational cathode drum, the anode plate and rotational cathode drum spaced apart from each other in an electrolytic solution contained in an electrolytic bath; and dipping the copper foil in an anticorrosion solution, wherein the anode plate comprises first and second anode plates electrically insulated from each other, the forming the copper film comprises forming a seed layer by allowing a current to flow between the first anode plate and the rotational cathode drum, and then growing the seed layer by allowing a current to flow between the second anode plate and the rotational cathode drum, and a current density provided by the first anode plate is 1.5 times or more higher than a current density provided by the second anode plate.

General description related to the present disclosure given above serves to illustrate or disclose the present disclosure and should not be construed as limiting the scope of the present disclosure.

According to the present disclosure, a electrolytic copper foil the fold and/or wrinkle of which can be avoided or minimized during a roll-to-roll (RTR) process is used to produce a subassembly and a final product, such as a flexible printed circuit board, a secondary battery, and the like, so that the productivity of the final product as well as the subassembly can be increased.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Hereinafter, embodiments according to the present disclosure will be described in detail with reference to the annexed drawings.

Those skilled in the art will appreciate that various modifications, additions and substitutions are possible, without departing from the scope and spirit of the disclosure as disclosed in the accompanying claims. Accordingly, the present disclosure includes modifications and alterations which fall within the scope of disclosures as claimed and equivalents thereto.

Figure 1:
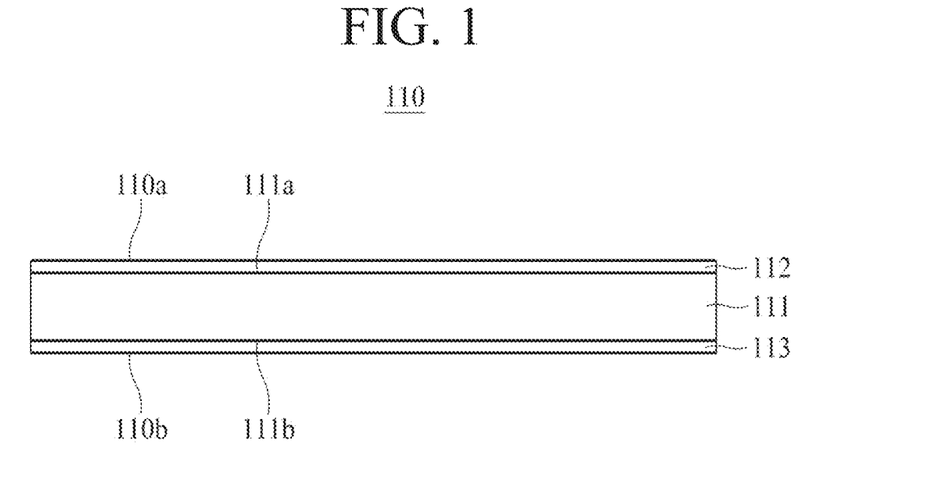
FIG. 1 is a sectional view of an electrolytic copper foil according to an embodiment of the present disclosure.

FIG. 1 is a sectional view of an electrolytic copper foil 110 according to an embodiment of the present disclosure.

As illustrated in FIG. 1, an electrolytic copper foil 110 of the present disclosure has a first surface 110a and a second surface 110b opposite to the first surface 110a and comprises a first protective layer 112 at the first surface 110a, a second protective layer 113 at the second surface 110b, and a copper film 111 between the first and second protective layers 112 and 113.

An electrolytic copper foil 110 according to one embodiment of the present disclosure has a thickness of 4 to 35 μm.

An electrolytic copper foil 110 having a thickness less than 4 μm causes a deterioration of the workability when it is manufactured. On the other hand, when a secondary battery is produced with an electrolytic copper foil 110 having a thickness more than 35 μm, it is difficult to make a secondary battery of high capacity due to the thick copper foil 110.

The copper film 111 may be formed on a rotational cathode drum through an electroplating process and has a shiny surface 111a which was in contact with the rotational cathode drum and a matte surface 111b opposite thereto.

An anticorrosion material is deposited on the copper film 111 to form the first and second protective layers 112 and 113 respectively. The anticorrosion material may comprise at least one of chromate, benzotriazole (BTA), chromic oxide, and a silane compound. The first and second protective layers 112 and 113 inhibit oxidation and corrosion of the copper film 111 and improve the heat resistance thereof so that the lifespan of the product including the electrolytic copper foil 110 can be increased.

To inhibit a fold and/or curl of the electrolytic copper foil 110, it is preferred that the portions of the electrolytic copper foil 110, which are disposed adjacent to the first and second surfaces 110a and 110b respectively, have identical or very similar properties. Thus, according to one embodiment of the present disclosure, the copper film 111 has the shiny and matte surfaces 111a and 111b having identical or very similar roughness. The term "roughness" as used herein means a ten-point mean roughness ($R_{zJIS}$). Further, the difference between the deposition amount of the anticorrosion material of the first and second protective layers 112 and 113 which are formed by depositing the anticorrosion material on the copper film 111 is preferably 2.5 ppm/m$^2$ or less.

For example, the deposition amount of the first protective layer 112 is 0.6 to 4.1 ppm/m$^2$ and the deposition amount of the second protective layer 113 is 0.6 to 4.1 ppm/m$^2$. If the difference between the deposition amount of the anticorrosion material of the first and second protective layers 112 and 113 is more than 2.5 ppm/m$^2$, the fold and/or curl of the electrolytic copper foil 110 would occur during a roll-to-roll process, which would inevitably lead to the stop of the processing equipments.

The electrolytic copper foil 110 of the present disclosure has a longitudinal rising LR of 30 mm or less and a transverse rising TR of 25 mm or less, and the transverse rising TR is 8.5 times the longitudinal rising LR or less.

If the longitudinal rising LR is more than 30 mm, a fold of the electrolytic copper foil 110 would be caused between the two rolls adjacent to each other during the roll-to-roll process. If the transverse rising TR is more than 25 mm, the wrinkles would be caused at the right and left end portions of the electrolytic copper foil 110 during the roll-to-roll process.

Further, if the transverse rising TR is more than 8.5 times the longitudinal rising LR while the longitudinal rising LR and transverse rising TR of the electrolytic copper foil 110 satisfy the aforementioned ranges respectively, the force is applied to the electrolytic copper foil 110 in the transverse direction during the roll-to-roll process, thereby causing the wrinkles at the right and left end portions of the electrolytic copper foil 110.

Figure 2:
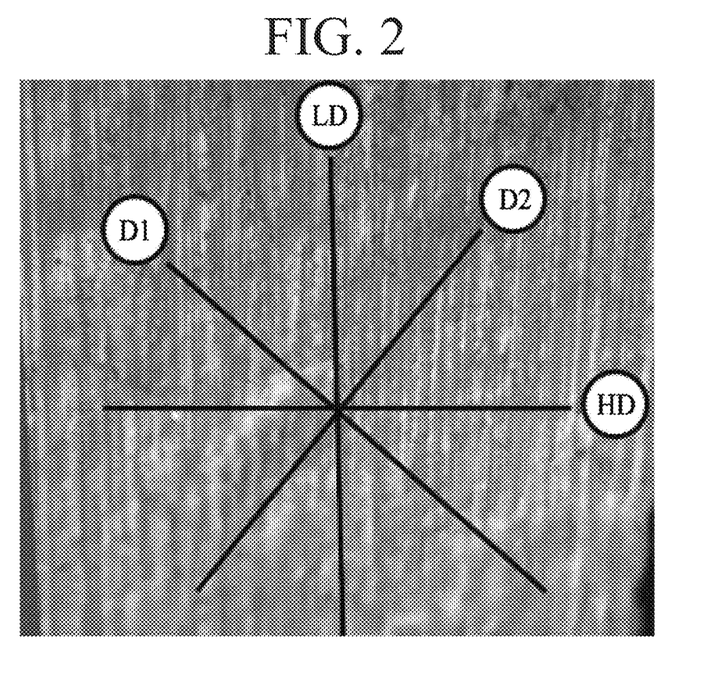
FIG. 2 shows how the longitudinal direction and transverse direction of the electrolytic copper foil is defined in the present disclosure.
Figure 3:
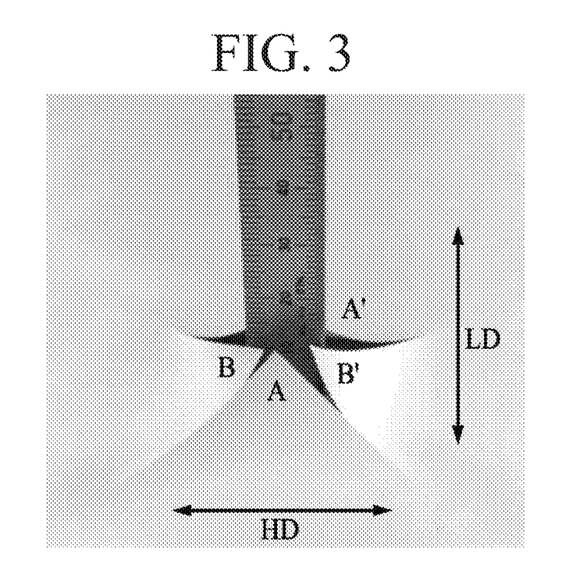
FIG. 3 shows a method for measuring the longitudinal rising and transverse rising of the electrolytic copper foil.

Hereinafter, referring to FIG. 2 and FIG. 3, a method for measuring the longitudinal rising LR and transverse rising TR will be explained in detail.

First, the center portion of the electrolytic copper foil 110 is cut along a X-shaped cutting line of 5 cm×5 cm in the first direction D1 which makes an angle of 35° to 55° with a longitudinal direction LD parallel with the transferring mark formed on the electrolytic copper foil 110 and in the second direction D2 perpendicular to the first direction D1 so that a pair of the first segments A and A' arranged side by side along the longitudinal direction LD and a pair of second segments B and B' arranged side by side along a transverse direction HD perpendicular to the longitudinal direction LD are formed. The transferring mark is the mark formed on the shiny surface 111*a* of the copper film 111 by the rotational cathode drum and can be identified by observing the first surface 110*a* adjacent to the shiny surface 111*a* with a microscope.

Then, the risings of the first segments A and A' in the direction the first or second surface 110*a* or 110*b* is facing are measured respectively, and the greater of the measured values is regarded as the longitudinal rising LR of the electrolytic copper foil 110. Likewise, the risings of the second segments B and B' in the direction the first or second surface 110*a* or 110*b* is facing are measured respectively, and the greater of the measured values is regarded as the transverse rising TR of the electrolytic copper foil 110.

As mentioned above, according to the present disclosure, the portions of the electrolytic copper foil 110, which are disposed adjacent to the first and second surfaces 110*a* and 110*b* respectively, have identical or very similar properties.

Therefore, according to one embodiment of the present disclosure, each of the first and second surfaces 110*a* and 110*b* has a ten-point mean roughness $R_{zJIS}$ of 3.5 μm or less, and the ten-point mean roughness deviation of the first and second surfaces 110*a* and 110*b*, which is calculated according to following formula, is 70% or less:

$$R_D = [|R_1 - R_2|/(R_1, R_2)_{max}] \times 100 \quad \text{formula}$$

wherein $R_1$ is the ten-point mean roughness of the first surface 110*a*, $R_2$ is the ten-point mean roughness of the second surface 110*b*, $R_D$ is the ten-point mean roughness deviation of the first and second surfaces 110*a* and 110*b*, $|R_1 - R_2|$ is the difference between the ten-point mean roughness of the first and second surfaces 110*a* and 110*b*, and $(R_1, R_2)_{max}$ is the greater of the ten-point mean roughness of the first and second surfaces 110*a* and 110*b*.

If the ten-point mean roughness $R_{zJIS}$ of the first and second surfaces 110*a* and 110*b* of the electrolytic copper foil 110 is more than 3.5 μm, the adhesive strength between the electrolytic copper foil 110 and the anode active material which is coated on both surfaces of the electrolytic copper foil 110 to produce a secondary battery would be insufficient.

Hereinafter, only for the sake of explanation, the present disclosure will be described based on an embodiment in which the electrolytic copper foil 110 of the present disclosure is used to produce a secondary battery. However, as mentioned above, the electrolytic copper foil 110 of the present disclosure can be similarly used to produce a variety of other products which can be manufactured through a roll-to-roll process, e.g., a flexible printed circuit board (FPCB).

A lithium ion secondary battery includes a cathode, an anode, an electrolyte for providing an environment enabling the lithium ions to move between the cathode and the anode, and a separator for electrically insulating the cathode from the anode to prevent the electrons generated by one electrode from moving toward the other electrode through the inside part of the secondary battery and being worthless consumed.

Figure 4:
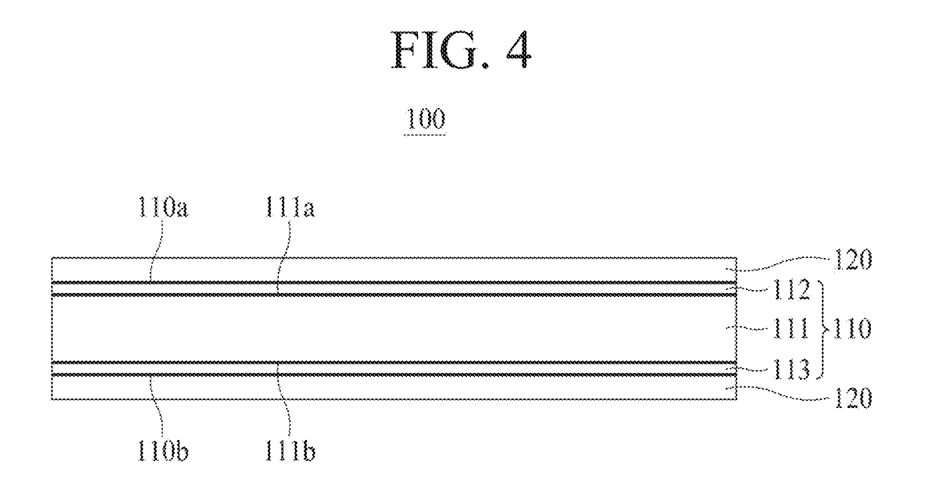
FIG. 4 is a sectional view of an electrode for secondary battery according to an embodiment of the present disclosure.

FIG. 4 is a sectional view of an electrode for secondary batteries according to an embodiment of the present disclosure.

As illustrated in FIG. 4, the electrode 100 for a secondary battery according to an embodiment of the present disclosure comprises an electrolytic copper foil 110 of one of the embodiments of the present disclosure and an active material layer 120.

FIG. 4 illustrates the active material layer 120 which is formed on both of the first and second surfaces 110*a* and 110*b* of the electrolytic copper foil 110, but the present disclosure is not limited thereto and the active material layer 120 may be formed on only one surface of the electrolytic copper foil 110.

In general, in a lithium secondary battery, an aluminum foil is used as a cathode current collector coupled to a cathode active material and an electrolytic copper foil 110 is used as an anode current collector coupled to an anode active material.

According to one embodiment of the present disclosure, the electrode 100 for a secondary battery is an anode, the electrolytic copper foil 110 is used as an anode current collector, and the active material layer 120 includes an anode active material.

The active material layer 120 comprises, as the anode active material, at least one active material selected from the group consisting of: carbon; a metal of Si, Ge, Sn, Li, Zn, Mg, Cd, Ce, Ni or Fe; an alloy including the metal; an oxide of the metal; and a complex of the metal and carbon.

In order to increase the charge/discharge capacity of the secondary battery, the active material layer 120 may be formed using a mixture of the anode active materials containing a predetermined amount of Si.

As the charge and discharge of the secondary battery is repeated, the active material layer 120 contracts and expands alternately and repeatedly, which induces separation of the active material layer 120 from the electrolytic copper foil 110, causing deterioration in charge/discharge efficiency of the secondary battery. Accordingly, in order for the secondary electrodes to secure predetermined levels of capacity maintenance and lifespan (i.e., in order to prevent deterioration in charge/discharge efficiency of the secondary battery), the electrolytic copper foil 110 should have excellent coatability with respect to the active material so that adhesion strength between the electrolytic copper foil 110 and the active material layer 120 can be increased.

In a broad sense, the lower the ten-point mean roughness $R_{zJIS}$ of the first and second surfaces 110*a* and 110*b* of the electrolytic copper foil 110 is, the less the charge/discharge efficiency of the secondary battery deteriorates.

Accordingly, each of the first and second surfaces 110*a* and 110*b* of the electrolytic copper foil 110 according to one embodiment of the present disclosure has a ten-point mean roughness $R_{zJIS}$ of 3.5 μm or less. If the first or second surface 110*a* or 110*b* has a ten-point mean roughness $R_{zJIS}$ exceeding 3.5 μm, the contact uniformity between the electrolytic copper foil 110 and the active material layer 120 would not reach a desired level and the secondary battery thus cannot satisfy the capacity maintenance of 90% or higher, which is required in the art.

Hereinafter, referring to FIG. 5, a method manufacturing an electrolytic copper foil 110 according to an embodiment of the present disclosure will be described in detail.

The method of the present disclosure comprises allowing a current to flow between an anode plate 30 and a rotational cathode drum 40 to form a copper film 111 on the rotational cathode drum 40, the anode plate 30 and rotational cathode drum 40 spaced apart from each other in an electrolytic solution 20 contained in an electrolytic bath 10, and dipping the copper foil 111 in an anticorrosion solution 60.

Figure 5:
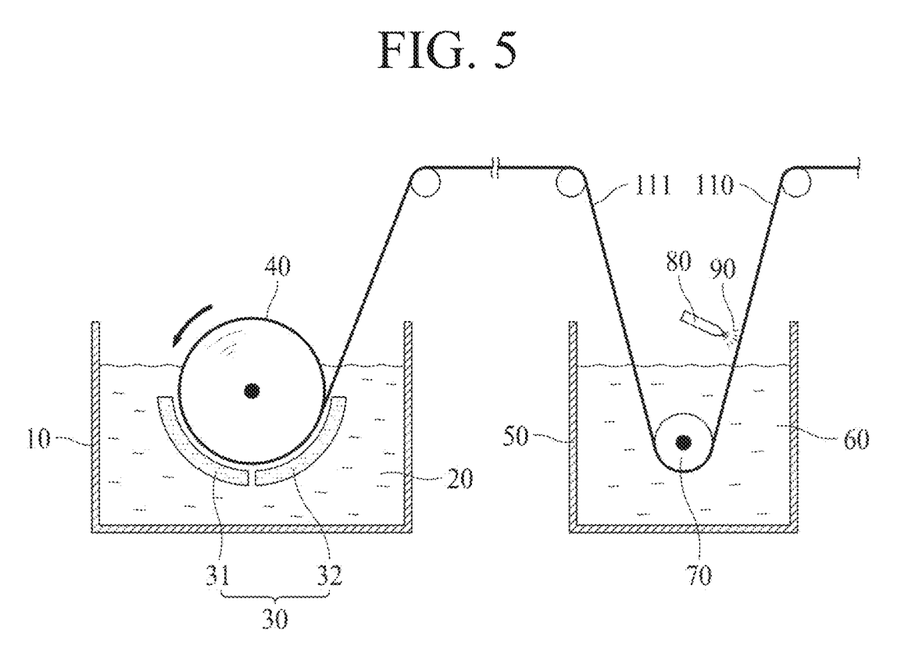
FIG. 5 illustrates an apparatus for manufacturing an electrolytic copper foil according to an embodiment of the present disclosure.

As illustrated in FIG. 5, the anode plate 30 comprises the first anode plate 31 and the second anode plate 32 electrically insulated from each other.

The process for forming the copper film 111 comprises forming a seed layer by allowing a current to flow between the first anode plate 31 and the rotational cathode drum 40, and then growing the seed layer by allowing a current to flow between the second anode plate 32 and the rotational cathode drum 40.

The current density provided by the first and second anode plates 31 and 32 may be 40 to 70 A/dm$^2$.

According to the present disclosure, the current density provided by the first anode plate 31 is 1.5 times or more higher than the current density provided by the second anode plate 32. In other words, relatively high current density is applied when the seed layer is formed so that the grain size of the seed layer can be decreased and, as a result, the shiny surface 111a and matte surface 111b of the copper film 111 can have identical or similar grain size.

Since the shiny surface 111a and matte surface 111b of the copper film 111 have identical or similar grain size, the electrolytic copper film 110 of the present disclosure can have the longitudinal rising LR of 30 mm or less and the transverse rising TR of 25 mm or less, and the transverse rising TR can be 8.5 times the longitudinal rising LR or less.

According to another embodiment of the present disclosure, the anode plate 30 may further comprise the third anode plate between the first and second anode plates 31 and 32. In this instance, the current density provided by the third anode plate is lower than the current density provided by the first anode plate 31 and higher than the current density provided by the second anode plate 32.

According to one embodiment of the present disclosure, the electrolytic solution 20 may comprise 50 to 100 g/L of a copper ion, 50 to 150 g/L of sulfuric acid, 50 ppm or less of a chlorine ion, and an organic additive. The organic additive may be gelatin, hydroxyethyl cellulose (HEC), organic sulfide, organic nitride, a thiourea compound, or a mixture of two or more thereof. When the copper film 111 is formed, the electrolytic solution 20 may be maintained at 50 to 60° C. and the electrolytic solution 20 may be supplied into the electrolytic bath 10 at the flow rate of 40 to 46 m$^3$/hour. If the flow rate of the electrolytic solution 20 is less than 40 m$^3$/hour, the copper ion could not be effectively supplied to the surface of the rotational cathode drum 40 and a non-uniform film would be plated. On the other hand, if the flow rate of the electrolytic solution 20 is more than 46 m$^3$/hour, such a high flow velocity of the electrolytic solution 20 would cause the rapid drop of the lifespan of the filter.

The surface of the rotational cathode drum 40 affects the ten-point mean roughness $R_{zJIS}$ of the shiny surface 111a of the copper film 111. According to one embodiment of the present disclosure, the surface of the rotational cathode drum 40 may be polished with a polishing brush of #800 to #1500 grit.

As described above, the anticorrosion solution 60 comprises at least one of chrome-containing compound, benzotriazole, and silane compound. For example, the copper film 111 may be dipped in a solution containing 0.2 to 2.5 g/L of chromate for 0.2 to 20 seconds.

The method of the present disclosure may further comprise taking the copper film 111 out of the anticorrosion solution 60. As illustrated in FIG. 5, the copper film 111 is guided by a guide roll 70 disposed in the anticorrosion solution 60 when the copper film 111 is dipped in and taken out of the anticorrosion solution 60.

When the dipping process is performed, the amount of the anticorrosion solution 60 coated on the surface of the copper film 111 which is in contact with the guide roll 70 (e.g., the shiny surface 111a) is necessarily smaller than the amount of anticorrosion solution 60 coated on the other surface of the copper film 111 exposed to the anticorrosion solution 60 (e.g., the matte surface 111b). Consequently, when the first and second protective layers 112 and 113 are formed on the shiny and matte surfaces 111a and 111b respectively, a serious difference in the deposition amount of the anticorrosion material occurs, which may induce the fold and/or curl (wrinkle) of the electrolytic copper foil 110.

Therefore, the method of the present disclosure may further comprise, after taking the copper film 111 out of the anticorrosion solution 60, spraying an anticorrosion solution 90 by means of a nozzle 80 onto the surface of the copper film 111 which was in contact with the guide roll 70 during the dipping process. Spraying the anticorrosion solution 90 can avoid or minimize the difference in the deposition amount of the anticorrosion material, which otherwise would be caused when the first and second protective layers 112 and 113 are formed respectively.

At least one active material selected from the group consisting of a carbon, a metal of Si, Ge, Sn, Li, Zn, Mg, Cd, Ce, Ni or Fe, an alloy including the metal, an oxide of the metal, and a complex of the metal and carbon is coated on the first surface 110a and/or the second surface 110b of the electrolytic copper foil 110 of the present disclosure manufactured through the method as described above to produce an electrode (i.e., anode) of the present disclosure for a secondary battery.

For example, 100 parts by weight of carbon as an anode active material, 1 to 3 parts by weight of styrene butadiene rubber (SBR) and 1 to 3 parts by weight of carboxymethyl cellulose (CMC) are mixed and produced into a slurry using a distilled water as a solvent. Subsequently, the slurry is coated on the electrolytic copper foil 110 using a doctor blade to a thickness of 20 to 60 μm and pressed at 110 to 130° C. and at a pressure of 0.5 to 1.5 ton/cm$^2$.

A lithium secondary battery can be manufactured using the electrode (anode) of the present disclosure for a secondary battery produced through the method as described above, in combination with the conventional cathode, electrolyte and separator.

Hereinafter, the present disclosure will be described in more detail with reference to the following examples and comparative examples. The following examples are only given for better understanding of the present disclosure and should not be construed as limiting the scope of the present disclosure.

EXAMPLE 1

By allowing a current to flow between an anode plate and a rotational cathode drum, which are spaced apart from each other in an electrolytic solution contained in an electrolytic bath, a copper film was formed on the rotational cathode drum. The electrolytic solution included 85 g/L of copper ions, 75 g/L of sulfuric acid, 20 ppm of chlorine ions, and organic additives. Gelatin, hydroxyethyl cellulose (HEC), organic sulfide, and organic nitride were used as the organic additives. While the copper film was formed, the electrolytic solution was maintained at about 55° C. and was supplied into the electrolytic bath at the flow rate of 40 m$^3$/hour.

The anode plate included the first and second anode plates electrically insulated from each other. The current density provided by the first anode plate was 60 A/dm² and the current density provided by the second anode plate was 40 A/dm².

The copper film was dipped in the 2 g/L chromate solution for 10 seconds, and then the 2 g/L chromate solution was sprayed onto the surface which was in contact with the guide roll during the dipping process. Subsequently, the chromate solution was dried to form the protective layers on both surfaces of the copper film. As a result, an electrolytic copper foil having thickness of 4 µm was obtained.

EXAMPLE 2

An electrolytic copper foil was produced in the same manner as that of the Example 1 except that the current density provided by the first anode plate was 70 A/dm².

EXAMPLE 3

An electrolytic copper foil was produced in the same manner as that of the Example 1 except that there was further provided the third anode plate between the first and second anode plate and the current density provided by the third anode plate was 55 A/dm².

COMPARATIVE EXAMPLE 1

An electrolytic copper foil was produced in the same manner as that of the Example 1 except that the same current density of 50 A/dm² was provided by each of the first and second anode plates.

COMPARATIVE EXAMPLE 2

An electrolytic copper foil was produced in the same manner as that of the Example 1 except that the same current density of 50 A/dm² was provided by each of the first and second anode plates and the process of spraying the chromate solution was omitted.

COMPARATIVE EXAMPLE 3

An electrolytic copper foil was produced in the same manner as that of the Example 1 except that the process of spraying the chromate solution was omitted.

The longitudinal rising, transverse rising, ratio of transverse rising to longitudinal rising, deposition amount of the anticorrosion material (chrome), ten-point mean roughness ($R_{zJIS}$), and ten-point mean roughness deviation of the electrolytic copper foils of the Examples and Comparative Examples were measured respectively according to the following methods, and the results of the measurements are shown in the following Table 1.

Longitudinal Rising (LR), Transverse Rising (TR), and Ratio of Transverse Rising to Longitudinal Rising (TR/LR)

The center portion of the electrolytic copper foil was cut along a X-shaped cutting line of 5 cm×5 cm in the first direction which makes an angle of 35° to 55° with a longitudinal direction parallel with the transferring mark formed on the electrolytic copper foil and in the second direction perpendicular to the first direction so that a pair of the first segments arranged side by side along the longitudinal direction and a pair of second segments arranged side by side along a transverse direction perpendicular to the longitudinal direction LD were formed. The transferring mark, a mark formed on the shiny surface of the copper film by the rotational cathode drum, was identified by observing the first surface adjacent to the shiny surface with a microscope.

Then, the risings of the first and second segments in the direction the first surface (a surface adjacent to the shiny surface of the copper film) or the second surface opposite to the first surface was facing were measured respectively by means of a ruler. The greater of the measured risings of the first segments and the greater of the measured risings of the second segments were regarded as the longitudinal rising (LR) and the transverse rising (TR) of the electrolytic copper foil, respectively. Then, the ratio of the transverse rising to the longitudinal rising (TR/LR) was obtained by dividing the transverse rising (TR) by the longitudinal rising (LR).

Deposition Amount of the Anticorrosion Material (Chrome)

The amount of the chrome deposited on each of the first surface (a surface adjacent to the shiny surface of the copper film) and the second surface opposite to the first surface of the electrolytic copper foil was measured by means of Atomic Absorption Spectrometry (AAS).

Ten-Point Mean Roughness ($R_{zJIS}$) and Ten-Point Mean Roughness Deviation

The ten-point mean roughness ($R_{zJIS}$) of the first surface (a surface adjacent to the shiny surface of the copper film) and second surface opposite thereto of the electrolytic copper foil were measured respectively by the method regulated by JIS B 0601-1994, using a contact type surface roughness measuring instrument.

Then, the ten-point mean roughness deviation (%) of the electrolytic copper foil was calculated in accordance with the following formula.

$$R_D = [|R_1 - R_2|/(R_1, R_2)_{max}] \times 100 \quad \text{Formula}$$

wherein $R_1$ is the ten-point mean roughness of the first surface, $R_2$ is the ten-point mean roughness of the second surface, $R_D$ is the ten-point mean roughness deviation of the first and second surfaces, $|R_1-R_2|$ is the difference between the ten-point mean roughness of the first and second surfaces, and $(R_1, R_2)_{max}$ is the greater of the ten-point mean roughness of the first and second surfaces.

TABLE 1

| | | Ex. 1 | Ex. 2 | Ex. 3 | Comp. Ex. 1 | Comp. Ex. 2 | Comp. Ex. 3 |
|---|---|---|---|---|---|---|---|
| Current density (A/dm²) | 1st anode plate | 60 | 70 | 60 | 50 | 50 | 60 |
| | 2nd anode plate | 40 | 40 | 40 | 50 | 50 | 40 |
| | 3rd anode plate | — | — | 55 | — | — | — |
| Whether chromate solution was sprayed or not | | ○ | ○ | ○ | ○ | x | x |
| LR (mm) | | 3.5 | 28.9* | 2.9 | 31.5* | 3.5 | 1.3 |
| TR (mm) | | 2.5 | 3.1 | 24.3* | 2.5 | 25.5* | 11.4 |
| TR/LR | | 0.7 | 0.1 | 8.4 | 0.1 | 7.3 | 8.8 |
| Deposition amount of anticorrosion material (ppm/m²) | 1st surface | 1.5 | 2.1 | 4.1 | 1.0 | 4.8 | 1.2 |
| | 2nd surface | 2.2 | 3.9 | 1.7 | 4.6 | 1.1 | 4.3 |
| Difference in deposition amount of anticorrosion material (ppm/m²) | | 0.7 | 1.8 | 2.4 | 2.8 | 3.7 | 3.2 |
| $R_{zJIS}$ (µm) | 1st surface | 1.6 | 1.1 | 0.6 | 0.5 | 2.1 | 2.7 |

TABLE 1-continued

|  | Ex. 1 | Ex. 2 | Ex. 3 | Comp. Ex. 1 | Comp. Ex. 2 | Comp. Ex. 3 |
|---|---|---|---|---|---|---|
| $2^{nd}$ surface | 1.3 | 1.2 | 1.9 | 1.9 | 0.5 | 0.6 |
| $R_{zJIS}$ deviation (%) | 19 | 8 | 68 | 74 | 76 | 78 |
| Whether fold occurs or not | No | No | No | Yes | No | No |
| Whether wrinkle occurs or not | No | No | No | No | Yes | Yes |

Note:
The longitudinal rising (LR) and transverse rising (TR) with the mark * are rising in the direction the first surface (a surface adjacent to the shiny surface of the copper film) of the electrolytic copper foil is facing, and the ones without the mark * are rising in the direction the second surface of the electrolytic copper foil is facing.

Table 1 above shows that the fold of the electrolytic copper foil occurs between the rolls adjacent to each other during a roll-to-roll process if the longitudinal rising (LR) of the electrolytic copper foil is more than 30 mm (Comp. Ex. 1) and the wrinkles of the electrolytic copper foil are caused at the right and left end portions of the electrolytic copper foil during a roll-to-roll process if the transverse rising (TR) of the electrolytic copper foil is more than 25 mm (Comp. Ex. 2).

Additionally, it has been found that, as in the case of the Comparative Example 3, if the transverse rising (TR) is more than 8.5 times the longitudinal rising (LR), even the electrolytic copper foil having the longitudinal rising (LR) of 30 mm or less and transverse rising (TR) of 25 mm or less wrinkles at the right and left end portions thereof during a roll-to-roll process.

The invention claimed is:

1. A method for manufacturing an electrolytic copper foil, the method comprising:
    allowing a current to flow between an anode plate and a rotational cathode drum to form a copper film on the rotational cathode drum, the anode plate and the rotational cathode drum spaced apart from each other in an electrolytic solution contained in an electrolytic bath;
    dipping the copper film in an anticorrosion solution; and
    taking the copper film out of the anticorrosion solution,
    wherein the copper film is guided by a guide roll disposed in the anticorrosion solution when the copper film is dipped in and taken out of the anticorrosion solution, and
    wherein the method further comprises, after taking the copper film out of the anticorrosion solution, spraying an anticorrosion solution onto a surface of the copper film which was in contact with the guide roll during the dipping process.

2. The method according to claim 1, wherein the anode plate comprises first and second plates electrically insulated from each other,
    wherein the forming the copper film comprises forming a seed layer by allowing a current to flow between the first plate and the rotational cathode drum, and then growing the seed layer by allowing a current to flow between the second plate and the rotational cathode drum, and
    wherein a current density provided by the first plate is 1.5 times or higher than a current density provided by the second plate.

3. The method according to claim 2, wherein the anode plate further comprises a third plate between the first and second plates, and
    a current density provided by the third plate is lower than the current density provided by the first plate and higher than the current density provided by the second plate.

4. The method according to claim 1, wherein the current density provided by the anode plate is 40 to 70 A/dm$^2$.

5. The method according to claim 1, wherein the electrolytic solution comprises 50 to 100 g/L of a copper ion, 50 to 150 g/L of sulfuric acid, 50 ppm or less of a chlorine ion and an organic additive.

6. The method according to claim 5, wherein the organic additive is gelatin, hydroxyethyl cellulose (HEC), organic sulfide, organic nitride, a thiourea compound, or a mixture of two or more thereof.

7. The method according to claim 1, wherein the electrolytic solution is supplied into the electrolytic bath at a flow rate of 40 to 46 m$^3$/hour when the copper film is formed.

* * * * *